United States Patent [19]

Kishigami

[11] Patent Number: 5,467,210
[45] Date of Patent: Nov. 14, 1995

[54] ARRANGEMENT OF BONDING IC CHIP TO LIQUID CRYSTAL DISPLAY DEVICE

[75] Inventor: Masamitsu Kishigami, Kokubunji, Japan

[73] Assignee: Casio Computer Co., Ltd., Tokyo, Japan

[21] Appl. No.: 192,489

[22] Filed: Feb. 7, 1994

[30] Foreign Application Priority Data

Feb. 16, 1993 [JP] Japan .................................. 5-051431
Jun. 1, 1993 [JP] Japan .................................. 5-156052

[51] Int. Cl.$^6$ .............................................. G02F 1/1343
[52] U.S. Cl. .............................................. 359/88; 359/85
[58] Field of Search .................................. 359/88, 85, 54

[56] References Cited

U.S. PATENT DOCUMENTS

| | | | |
|---|---|---|---|
| 4,042,861 | 8/1977 | Yasuda et al. | 359/88 |
| 4,422,731 | 12/1983 | Droguer et al. | 359/88 |
| 5,189,539 | 2/1993 | Suzuki | 359/88 |
| 5,200,847 | 4/1993 | Mawatari et al. | 359/54 |
| 5,270,848 | 12/1993 | Takabayashi et al. | 359/88 |
| 5,349,226 | 9/1994 | Kawaguchi et al. | 359/54 |

FOREIGN PATENT DOCUMENTS

| | | | |
|---|---|---|---|
| 0441398 | 8/1991 | European Pat. Off. | 359/88 |
| 63-29729 | 2/1988 | Japan | 359/88 |
| 3107127 | 5/1991 | Japan | 359/88 |
| 3271792 | 12/1991 | Japan | 359/88 |
| 4128717 | 4/1992 | Japan | 359/85 |

*Primary Examiner*—Anita Pellman Gross
*Assistant Examiner*—James A. Dudek
*Attorney, Agent, or Firm*—Frishauf, Holtz, Goodman, Langer & Chick

[57] ABSTRACT

A board-shaped lower glass substrate of a liquid crystal display (LCD) device has a size larger than a board-shaped upper glass substrate of the LCD device. An edge of part of the lower glass substrate extending beyond a corresponding edge of the upper glass substrate has a plurality of IC chips mounted thereon. Output pads connected to output electrodes of the IC chips are mounted to that edge of the lower glass substrate on the side of the display area of the LCD device. Input pads connected to input electrodes of the IC chips are mounted to that edge of the lower glass substrate on the side remote from the display area. Wiring patterns formed on that edge of the lower glass substrate and connected to the input and output pads extend along the direction of an arrangement of IC the chips. One end of each wiring pattern is positioned at an edge of the lower glass substrate. This arrangement enables the LCD module to be connected to a control device outside the LCD module by a single flexible connector with a single side wiring pattern being formed.

20 Claims, 9 Drawing Sheets

ARRANGEMENT OF BONDING IC CHIP TO LIQUID CRYSTAL DISPLAY DEVICE

BACKGROUND OF THE INVENTION

1. Field of the Invention

The present invention relates to an arrangement of direct-bonding a plurality of integrated-circuit (IC) chips to a liquid crystal display (LCD) device so that the IC chips are electrically connected to the LCD device.

2. Description of the Related Art

FIG. 9 is a plan view of a conventional typical arrangement of bonding IC chips to an LCD device. A conventional LCD module 1 comprises an LCD device 2, three IC chips 3a, 3b and 3c bonded to the LCD device 2, and two flexible connector 4 and 5 in the form of a flexible printed wiring board. The LCD device 2 comprises an upper glass substrate 6 in the form of a rectangular board and a lower glass substrate 7 in the form of a rectangular board opposite to each other. However, the upper glass substrate 6 includes an end strip 6a extending beyond the end of the lower glass substrate 7. The lower surface of the end strip 6a has a scanning-lines driving IC chip 3c mounted thereto. The lower surface of the upper glass substrate 6 has transparent strip-shaped wiring patterns 8a formed thereon and connected to output electrodes of the IC chip 3c. The wiring patterns 8a extend along the longitudinal axis of the upper glass substrate 6 in parallel to one another except at connections between one end of the wiring patterns 8a and the output electrodes of the IC chip 3c. The lower surface of the end strip 6a has transparent wiring patterns 8b formed thereon and having one end connected to inputs of the IC chip 3c. The other end of the wiring patterns 8b is connected to electrically conductive patterns 5a formed on or in the flexible connector 5.

The lower glass substrate 7 includes a side edge strip 7a extending beyond a side edge (a lower edge in FIG. 9) of the upper glass substrate 6. The upper surface of the side edge strip 7a has two IC chips 3a and 3b mounted thereto for driving data lines. The upper surface of the lower glass substrate 7 has transparent strip-shaped wiring patterns 9a formed thereon and connected to output electrodes of the IC chips 3a and 3b. The wiring patterns 9a extend along the transverse axis of the lower glass substrate 7 in parallel to one another except at connections between one end of the wiring patterns 9a and the output electrodes of the IC chips 3a and 3b.

As shown in FIG. 9, the wiring patterns 8a on the upper glass substrate 6 and the wiring patterns 9a on the lower glass substrate 7 constitute a matrix-shaped wiring pattern shown in two-dot chain lines to provide a display area S. The upper surface of the side edge strip 7a has transparent wiring patterns 9b, 9c formed thereon and having one end connected to input electrodes of the IC chips 3a and 3b. The wiring patterns 9b and 9c are connected to strip-shaped electrically-conductive patterns 4b and 4c formed on the lower surface of the flexible connector 4. The upper surface of the flexible connector 4 includes linear wiring patterns 4a extending along the longitudinal axis of the flexible connector 4. One end (left-hand ends in FIG. 9) of the wiring patterns 4a is connected to the wiring patterns 4b via plated through-holes 4d formed in the flexible connector 4. The other end (right-hand ends in FIG. 9) of the wiring patterns 4a is connected to the wiring patterns 4c via plated through-holes 4d. Since the wiring patterns 4a cross the wiring patterns 4c, the wiring patterns 4a and 4c must be formed on the opposite sides of the flexible connector 4. In other words, the flexible connector 4 must be in the form of a double-sided flexible printed wiring board.

The conventional LCD module is expensive since as described above the wiring patterns 4a, 4b and 4c must be formed on the opposite sides of the flexible connector 4 and connected to each other via the through-holes 4d when the IC chips 3a and 3b are bonded to the side edge strip 7a of the LCD device 2. In addition, the flexible connector 4 is prolonged so that the wiring patterns 4b and 4c are connected to the wiring patterns 9b and 9c formed on the lower glass substrate 7. In principle, an amount of a change in length of an elongated object due to a temperature change is proportional to the length of the object. Therefore, the flexible connector 4 tends to experience a misalignment between the through-holes 4d and the wiring patterns 4a and 4c due to a heat in bonding and a defective electrical conduction due to a heat change with environmental change. Since the LCD module 1 has an arrangement of mounting the IC chip 3c to the lower surface of the upper glass substrate 6 and the IC chips 3b and 3c to the upper surface of the lower glass substrate 7, it requires the need for the two flexible connectors 4 and 5. In addition, since the direction of a thermocompression bonding of the IC chip 3c to the flexible connector 5 is opposite to the direction of a thermocompression bonding of the IC chips 3a and 3b to the flexible connector 4, a bonding step of an LCD module production is time-consuming.

SUMMARY OF THE INVENTION

The present invention was made in view of the above-described situation. An object of the present invention is to provide an inexpensive reliable arrangement of bonding an IC chip to an LCD device which enables a simple downsized flexible connector to be employed and increases the efficiency of a bonding step of an LCD module production.

In order to achieve the object, the present invention is an arrangement of bonding IC chips to a liquid crystal display (LCD) device, comprising: an LCD device including a first board-shaped transparent substrate and a second board-shaped transparent substrate opposite to each other, the first transparent substrate having a size larger than the second transparent substrate so that the first transparent substrate includes an extension beyond an edge of the second transparent base board, a surface of the extension having first output wiring patterns formed thereon, each of the first output wiring patterns including a first output pad, the surface of the extension having first input wiring patterns formed thereon, each of the first input wiring patterns including a first input pad, the surface of the extension having second output wiring patterns, each of the second output wiring patterns including a second output pad, the surface of the extension having second input wiring patterns formed thereon, each of the second input wiring patterns including a second input pad, the first and second input pads being positioned nearer to an edge of the surface of the extension than the first and second output pads, the IC chips being arranged along the surface of the extension, the first and second input wiring patterns extending along the direction of the arrangement of the IC chips and being electrically connected to the first and second input pads; a first IC chip of the IC chips which includes output electrodes adjacent to and electrically connected to the first output pads and includes input electrodes adjacent to and electrically connected to the first input pads; a second IC chip of the IC chips which includes output electrodes adjacent to and electrically connected to the second output pads and includes input electrodes adjacent to and electrically connected to the second input pads; means for bonding the first output pads to the output electrodes of said first IC chip; means for bonding the first input pads to the input electrodes of said first IC chip; means for bonding the second output pads to the output electrodes of said second IC chip; and means for bonding the second input pads to the input electrodes of said second IC chip.

Other objects, features and advantages of the present invention will be apparent from a consideration of the following description, taken in connection with the accompanying drawing.

DETAILED DESCRIPTION OF THE PREFERRED EMBODIMENTS

First Embodiment

FIGS. 1–4 relate to an arrangement of bonding IC chips to an LCD device according to a first embodiment of the present invention.

Figure 1:
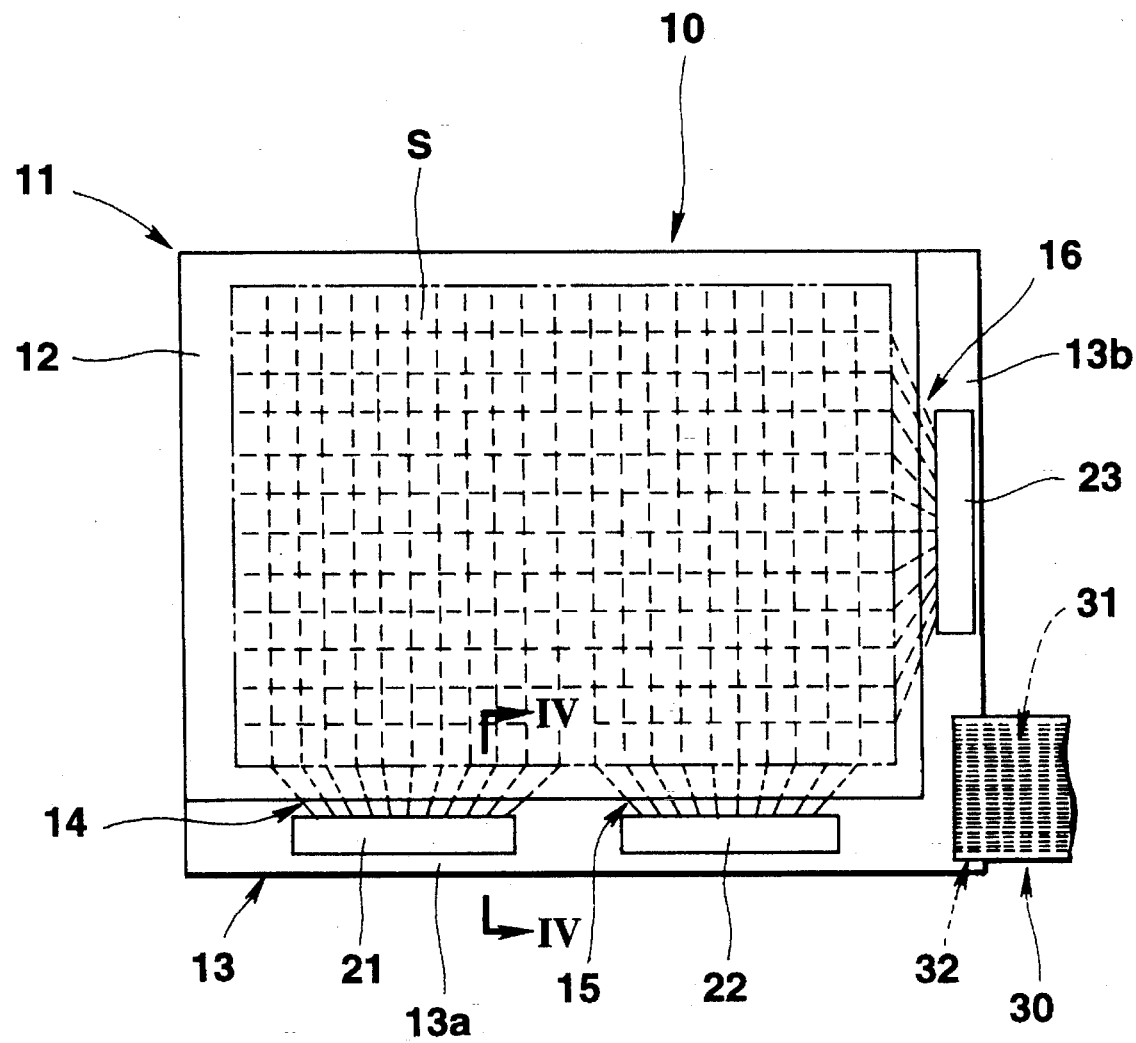
FIG. 1 is a plan view of an arrangement of bonding an IC chip to an LCD device according to a first embodiment of the present invention.

FIG. 1 is a plan view of an LCD module 10 comprising an LCD device 11, three rectangular IC chips of a first IC chip 21, a second IC chip 22 and a third IC chip 23 bonded to the LCD device 11, and a single simple downsized flexible connector 30 in the form of a flexible printed wiring board bonded to the LCD device 11. Unlike the convectional LCD module 1, the LCD module 10 can be connected to a control device outside it via the flexible connector 30 because of its arrangement described below.

The LCD device 11 includes a transparent upper glass substrate 12 in the form of a rectangular board and a transparent lower glass substrate 13 in the form of a rectangular board. The size of the lower glass substrate 13 is larger than that of the upper glass substrate 12 so that the lower glass substrate 13 includes a side edge strip 13a extending transversely beyond a side edge of the upper glass substrate 12 and an end strip 13b extending beyond an end of the upper glass substrate 12. As shown in FIG. 1, the side edge strip 13a (the lower side edge strip in FIG. 1) continues the end strip 13b (the right-hand end strip in FIG. 1) through a corner of the lower glass substrate 13. The upper surface of the side edge strip 13a has the two IC chips of the first IC chip 21 mounted thereon for driving data lines and the second IC chip 22 mounted thereon for driving data lines. On the other hand, the upper surface of the end strip 13b has the third IC chip 23 mounted thereon for driving scanning lines. The IC chips 21, 22 and 23 have the form of a bare IC chip. The term "bare IC chip" denotes an IC chip in which a single surface of a semiconductor bulk has multiple semiconductor devices fabricated thereon and a passivation film covers the semiconductor devices fabricated side portion of the single surface of a semiconductor bulk so that only terminals for connecting to a device outside these semiconductor devices are uncovered. That is, the bare IC chip lacks all of a lead frame to which the bare IC chip is bonded, leads, bonding wires connecting the terminals of the bare IC chip to the leads, and a package of a ceramic material or the like.

Figure 2:
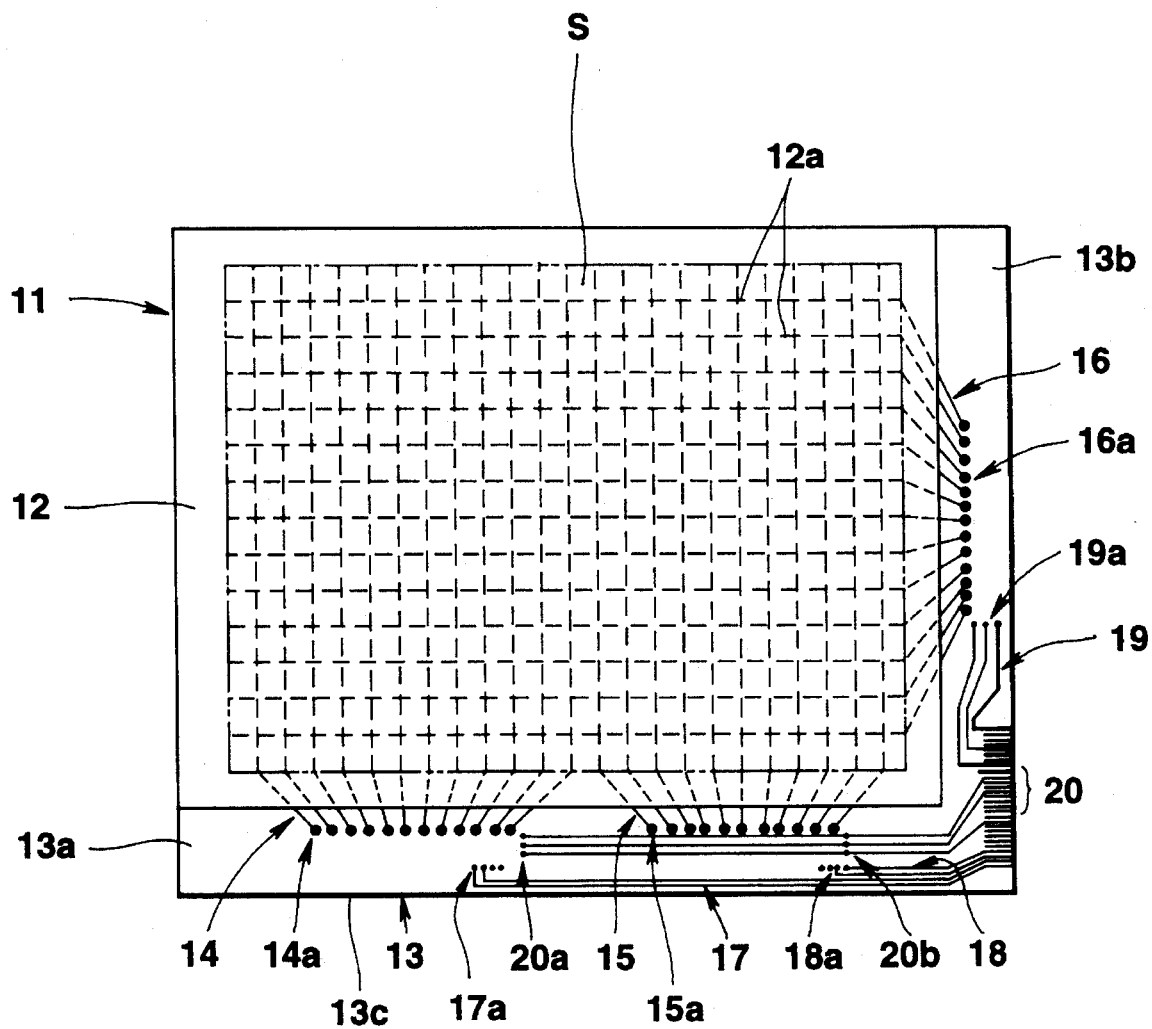
FIG. 2 is a plan view on a enlarge scale of major part of the LCD module of FIG. 1.

FIG. 2 is a plan view on an enlarged scale of wiring patterns of a transparent material such as indium tin oxide (ITO) formed on the lower surface of the upper glass substrate 12 and on the upper surface of the lower substrate 13. The upper surface of the side edge strip 13a has first transparent output wiring patterns 14 formed thereon and having first output pads 14a. The upper surface of the side edge strip 13a also has second transparent output wiring patterns 15 formed thereon and having second output pads 15a. The first and second output wiring patterns 14 and 15 include portions extending in parallel to the transverse axis of the lower glass substrate 13. The upper surface of the end strip 13b has third transparent output wiring patterns 16 formed thereon and having third output pads 16a.

The lower surface of the upper glass substrate 12 opposite to the upper surface of the lower glass substrate 13 has wiring patterns 12a formed thereon and extending along the longitudinal axis of the lower glass substrate 13. The wiring patterns 12a on the upper glass substrate 12 are connected to the third output wiring patterns 16 on the lower glass substrate 13 via cross elements (not shown) near an end (a right-hand end in FIG. 2) of the upper glass substrate 12 adjacent the end strip 13b. That is, the wiring patterns 14 and 15 constitute data lines to which data are provided and on the other hand the wiring patterns 12a constitute scanning lines which are successively scanned by a control signal. A rectangular area S shown in two-dot chain lines constitutes a display area in which the data lines and the scanning lines cross in the form of a matrix.

The upper surface of part of the lower glass substrate 13 which extends from a central area of the side edge strip 13a to part of the end strip 13b beyond the corner between the side edge strip 13a and the end strip 13b has non-common input wiring patterns 17 and 18 formed thereon nearer to the side edge 13c of the lower glass substrate 13 than the first and second output pads 14a and 15a, and has common input wiring patterns 20 formed thereon. The non-common input wiring patterns 17 and 18 extend in parallel to the longer side or side edge of the lower glass substrate 13 except at their connections to the common input wiring patterns 20. The common input wiring patterns 20 also extend in parallel to the longer side or side edge of the lower glass substrate 13. The non-common input wiring patterns 17 have first non-common input pads 17a adjacent to the right-hand end of the array of the first output pads 14a. The non-common input wiring patterns 18 have second non-common input pads 18a adjacent to the right-hand end of the array of the second output pads 15a. The common input wiring patterns 20 have common input pads 20a arranged between the right-hand end of the array of the first output pads 14a and the first non-common input pads 17a, and common input pads 20b arranged between the right-hand end of the array of the second output pads 15a and the second non-common input pads 18a.

Figure 3:
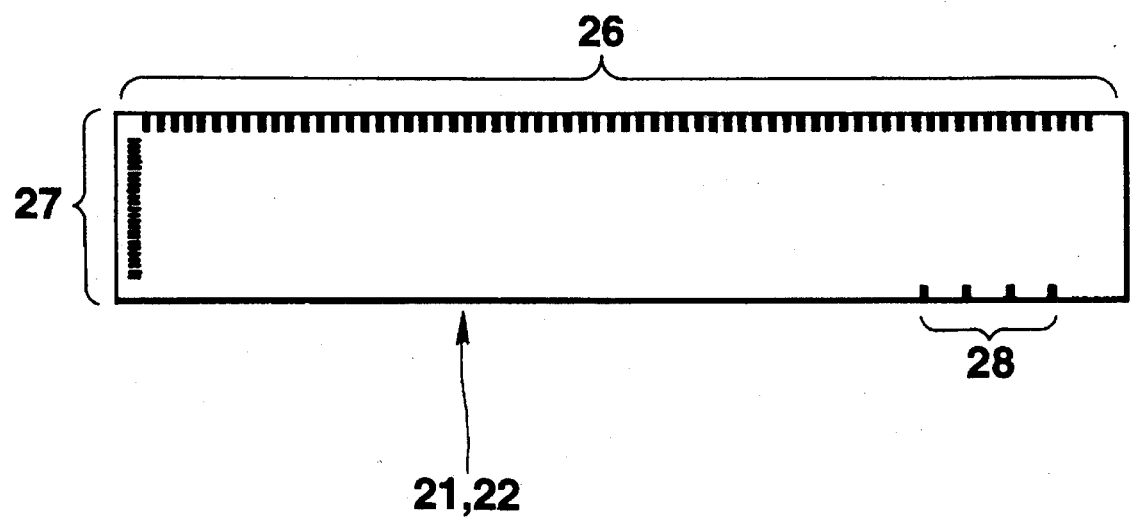
FIG. 3 is a bottom view on an enlarged scale of an IC chip of FIG. 1, showing an arrangement of electrodes formed on the underside (or back surface) of the IC chip.

FIG. 3 is a bottom view on an enlarged scale of the IC chip 21 (22) of FIG. 1. The length of the longer side of the IC chip 21 (22) is 3–6 times that of the shorter side of the IC chip 21 (22). The output electrodes 26 are arranged in contact with one longer side of the IC chip 21 (22). In case of the first IC chip 21 in a position mounted to the LCD device 11, the output electrodes 26 are adjacent to and electrically connected to the first output pads 14a. In case of the second IC chip 22 in a position mounted to the LCD device 11, the output electrodes 26 are adjacent to and electrically connected to the second output pads 15a. Non-common input electrodes 28 are arranged in contact with the other longer side of the IC chip 21 (22) near one end of the IC chip 21 (22). In case of the first IC chip 21 in the position mounted to the LCD device 11, the non-common input electrodes 28 are adjacent to and electrically connected to the first non-common input pads 17a. In case of the second IC chip 22 in the position mounted to the LCD device 11, the non-common input electrodes 28 are adjacent to and electrically connected to the second non-common input pads 18a. Common input electrodes 27 are along and near the other end of the IC chip 21 (22). In case of the first IC chip 21 in the position mounted to the LCD device 11, the common input electrodes 27 are adjacent to and electrically connected to the common input pads 20a. In case of the second IC chip 22 in the position mounted to the LCD device 11, the common input electrodes 27 are adjacent to and electrically connected to the common input pads 20b. Although an arrangement of electrodes of the IC chip 23 is not shown, it is identical to an arrangement of electrodes lacking the non-common input electrodes 28 of FIG. 3.

Figure 4:
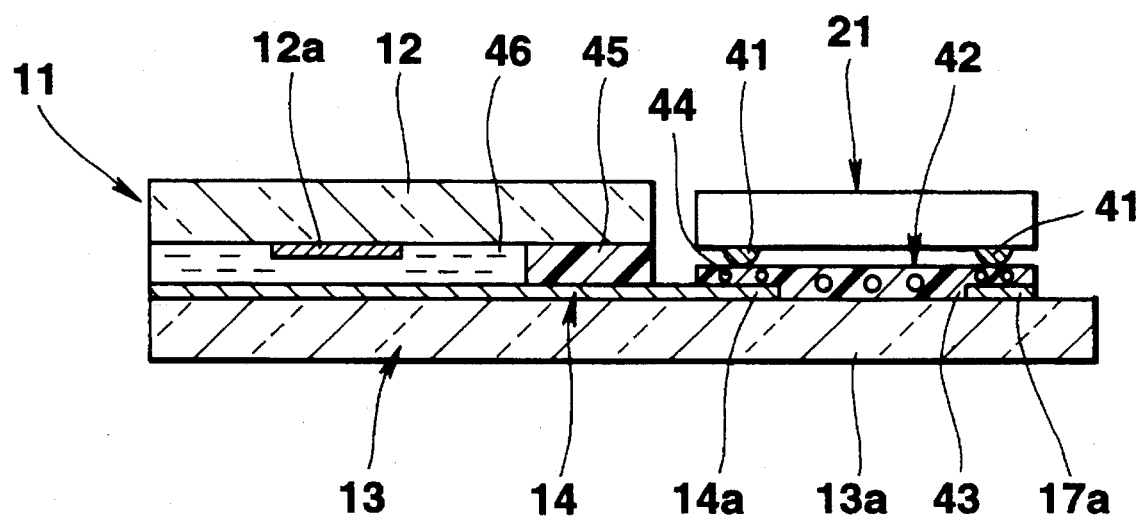
FIG. 4 is a sectional view taken along line IV—IV in FIG. 1.

FIG. 4 is a section on an enlarged scale taken along the line IV—IV in FIG. 1. The IC chip 21 includes bumps 41 swelling from the electrodes 26, 27 and 28. An anisotropic electrically-conductive adhesive 42 is applied to the upper surfaces of the pads 14a, 15a, 17a, 18a, 20a and 20b formed on the upper surface of the side edge strip 13a and to the upper surface of the side edge strip 13a. The anisotropic electrically-conductive adhesive 42 is a system consisting of an adhesive medium 43 and electrically-conductive particles 44 are dispersed in the adhesive medium 43 so as to separate from each other. The anisotropic electrically-conductive adhesive 42 possesses an electrical conductivity only along the thickness thereof. The IC chip 21 is bonded to the LCD device 11 so that the bumps 41 of the electrodes 26, 27 and 28 are bonded to the pads 14a, 17a and 20a by means of the anisotropic electrically-conductive adhesive 42. The IC chip 22 is bonded to the pads 15a, 18a and 20b in the same manner as the IC chip 21 although this is not shown. However, it should be understood that bonding the IC chips 21 and 22 to the LCD device 11 is not restricted to a bonding method with the anisotropic electrically-conductive adhesive. For example, bonding methods can be employed in which the bumps of the electrodes of the IC chips 21 and 22 are in direct contact with the corresponding pads and the IC chips 21 and 22 are bonded to the LCD device 11 using an ultraviolet hardened insulating adhesive and in which the upper surfaces of the pads of ITO or the like are plated with gold and the bumps of a solder of the IC chips 21 and 22 are directly bonded to the pads. In FIG. 4, a seal between the glass substrates 12 and 13 is denoted at 45. The upper glass substrate 12, the lower glass substrate 13 and the seal 45 together define a cell filled with a liquid crystal 46.

Referring back to FIG. 2, the upper surface of the end strip 13b of the lower glass substrate 13 has third input pads 19a arranged thereon near a side edge strip 13c side end (a lower end in FIG. 2) of the third output pad 16a. The third IC chip 23 is bonded to the pads 16a and 19a in the same manner as the IC chips 21 and 22. One end (right-hand ends in FIG. 2) of the wiring patterns 17, 18 and 20 and one end (lower ends in FIG. 2) of the wiring patterns 19 are arranged along and in contact with the right edge of the end strip 13b of the lower glass substrate 13 in or near the corner of the lower glass substrate 13 between the side edge strip 13a and the end strip 13b. Electrically-conductive patterns 31 formed on a single side surface of a flexible connector 30 in the form of a flexible printed wiring board are directly bonded to the one end of the wiring patterns 17, 18, 19 and 20 by using the anisotropic electrically-conductive adhesive, soldering or the like.

As described above, the LCD module 10 has the structure in which the first and second output pads 14a and 15a are positioned on the LCD area S side on the upper surface of the side edge strip 13c and in which the first and second non-common input pads 17a and 18a are positioned on the side remote from the LCD area S on the upper surface of the side edge strip 13c and in which the first common input pads 20a are positioned between the first output pads 14a and the first non-common input pads 17a and in which the second common input pads 20b are positioned between the second output pads 15a and the second non-common input pads 18a. Therefore, the wiring patterns 17, 18 and 20 do not cross one another on the upper surfaces of the side edge strip 13a and the end strip 13b. Thus, the wiring patterns 17, 18 and 20 must be connected to a control device outside the LCD module 11 via only the downsized simple flexible connector 30 including the electrically-conductive pattern 31 formed on its single side surface. As a result, manufacturing cost of the LCD module 11 can be reduced and efficiency and reliability in manufacturing the LCD module 11 can be increased. In addition, since the first, second and third IC chips 21, 22 and 23 are mounted on the same surface of the lower glass substrate 13 and the one end of the wiring patterns 19 is arranged near and in alignment with the one end of the wiring patterns 17, 18 and 20, the LCD module 11 can be connected to a control device outside the LCD module 11 using the single flexible connector 30. In addition, since thermocompressions of the IC chips 21, 22 and 23 and the flexible connector 30 have the same direction in bonding them to the LCD device 12, efficiency in manufacturing the LCD module 11 can be further increased.

Second Embodiment

In the first embodiment, the IC chip 21 is connected to the control device outside the LCD module 11 via the wiring patterns 17 and 20, and the IC chip 22 is connected to the control device via the wiring patterns 18 and 20, and the wiring patterns 17, 18 and 20 extend along the direction of the arrangement of the IC chips 21 and 22. Thus, the portions of the wiring patterns 17, 18 and 20 extending from the one end of the wiring patterns 17, 18 and 20 to the pads bonded to the IC chips 21 and 22 have different lengths. Since the wiring patterns 17, 18 and 20 of ITO or the like have relatively high electrical resistances, the wiring patterns 17, 18 and 20 may experience a large voltage drop as the lengths of them are increased. If a difference between liquid crystal drive voltages would be produced, liquid crystal cells would experience an inverted degree of gradation. The second embodiment contemplates to overcome this problem.

Figure 5:
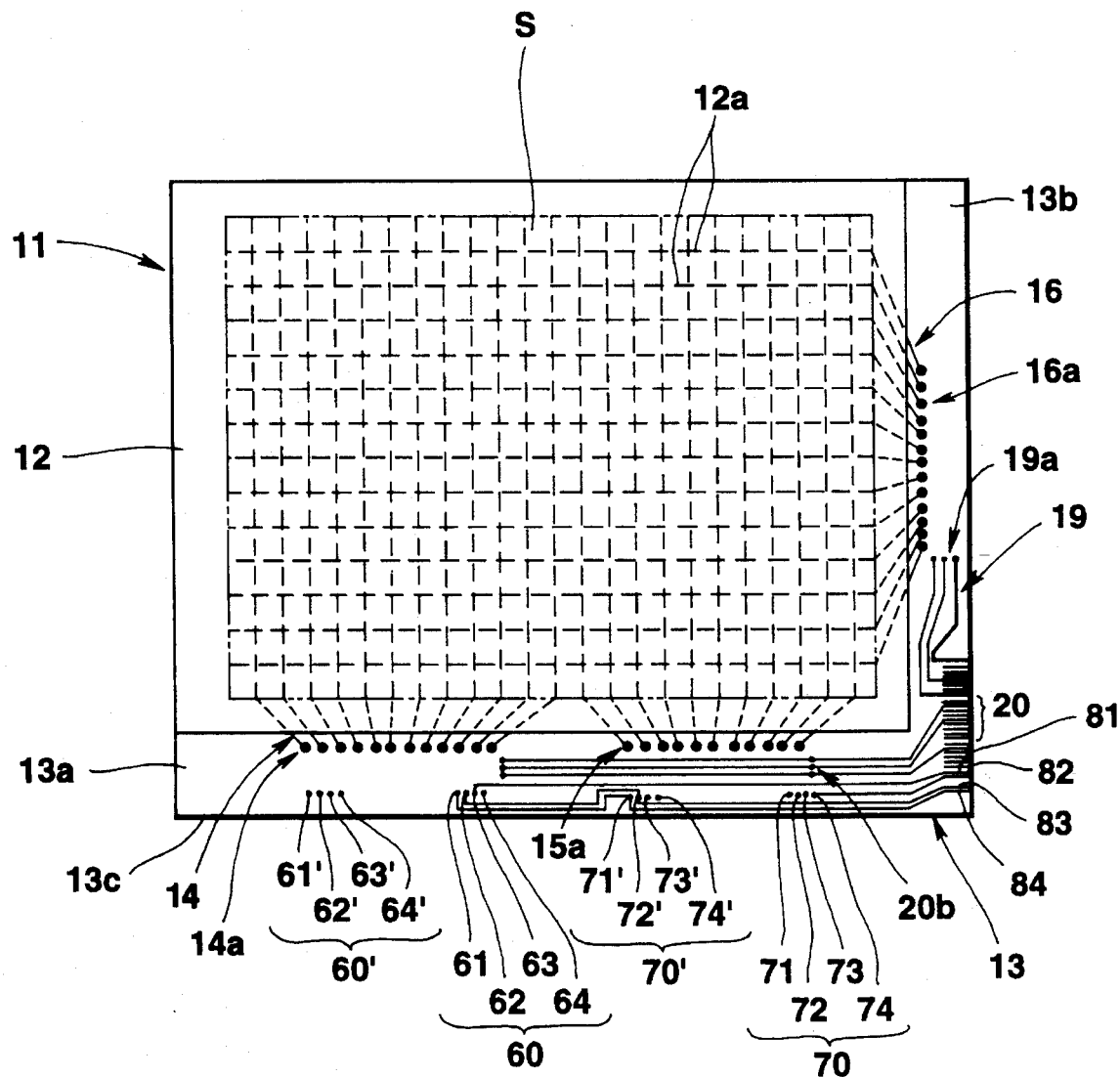
FIG. 5 is a plan view of an arrangement of bonding an IC chip to an LCD device according to a second embodiment of the present invention.
Figure 6:
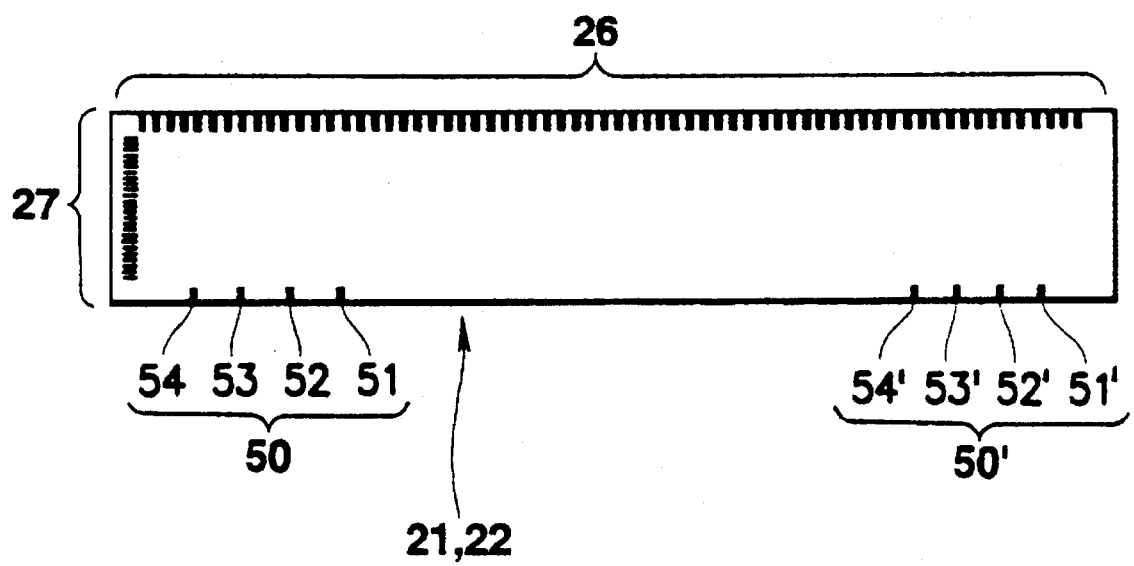
FIG. 6 is a bottom view on an enlarged scale of an IC chip of FIG. 5, showing an arrangement of electrodes formed on the underside of the IC chip.

FIGS. 5 and 6 show an arrangement of bonding IC chips to an LCD device according to a second embodiment of the present invention. Since parts of the second embodiment having the same labels as those of the first embodiment have the same or similar structures and operations as those of the first embodiment, descriptions of these parts of the second embodiment will be eliminated hereinafter. As shown in FIG. 6, IC chip 21 (22) includes an array 50 of electrodes 51-54 arranged on the underside of the IC chip 21 (22) and an array 50' of electrodes 51'-54' in contact with a longer side or side edge of the IC chip 21 (22) opposite to the longer side or side edge in contact with which an array of electrodes 26 are arranged. The electrode array 50 is positioned near one end (a left-hand end in FIG. 6) of the IC chip 21 (22) along which the electrode array 27 is arranged. The electrode array 50' is positioned near the other end (a right-hand end in FIG. 6) of the IC chip 21 (22) opposite to the on end of the IC chip 21(22). Although not shown, the electrode 51 is connected to the electrode 51' in the IC chip 21 (22). The electrodes 52, 53 and 54 are connected to the electrodes 52', 53' and 54' in the same manner as the electrode 51. The electrodes 51, 51', 52 and 52' constitute electrodes for receiving common control signals. The electrodes 53, 53', 54 and 54' constitute non-common electrodes for providing a power for driving the a liquid crystal.

As shown in FIG. 5, the upper surface of the side edge strip 13a of the lower glass substrate 13 has pad assemblies 60, 60' 70 and 70' formed thereon. The pad assembly 60 comprises pads 61-64. The pad assembly 60' comprises pads 61'-64'. The pad assembly 70 comprises pads 71-74. The pad assembly 70' comprises pads 71'-74'. The pads 61-64 are adjacent to and electrically connected to the electrodes 51-54 of the IC chip 21 in a position mounted to the LCD device 11. The pads 71-74 are adjacent to and electrically connected to the electrodes 51-54 of the IC chip 22 in a position mounted to the LCD device 11. The pads 61'-64' are adjacent to and electrically connected to the electrodes 51'-54' of the IC chip 21 in the position mounted to the LCD device 11. The pads 71'-74' are adjacent to and electrically connected to the electrodes 51'-54' of the IC chip 22 in the position mounted to the LCD device 11.

A non-common input wiring pattern 81 is connected to the pad 63. A non-common input wiring pattern 82 is connected to the pad 74. A common wiring pattern 83 is connected to the pads 72' and 62. A common input wiring pattern 84 is connected to the pads 71' and 61. The pad assembly 60 is connected to the electrode array 50 of the IC chip 21. The pad assembly 70' is connected to the electrode array 50' of the IC chip 22. That is, the common wiring patterns 83 and 84 are connected to the remote side electrode assembly 50' of the IC chip 22 nearer to the corner on the lower glass substrate 13 between the side edge strip 13a and the end strip 13b than the IC chip 21 and to the nearer side electrode assembly 50 of the IC chip 21 remote from this corner. Thus, a difference in length between the connection of the common wiring pattern 83 to the IC chip 21 and the connection of the common wiring pattern 83 to the IC chip 22 is more reduced than that of the first embodiment. A difference in length between the connection of the common wiring pattern 84 to the IC chip 21 and the connection of the common wiring pattern 84 to the IC chip 22 is also more reduced than that of the first embodiment. Therefore, a drop in the liquid crystal drive voltage due to a difference between the lengths of wiring patterns can be reduced. Resistance differences between the common input wiring pattern 20 and the non-common input wiring patterns 81, 82 are selected so as to have no effect on the display quality of the LCD device 11. The pads 61'-64', 64, 71, 72 and 73 not connected to the wiring patterns 81-84 may not be formed on the upper surface of the lower glass substrate 13.

Figure 7:
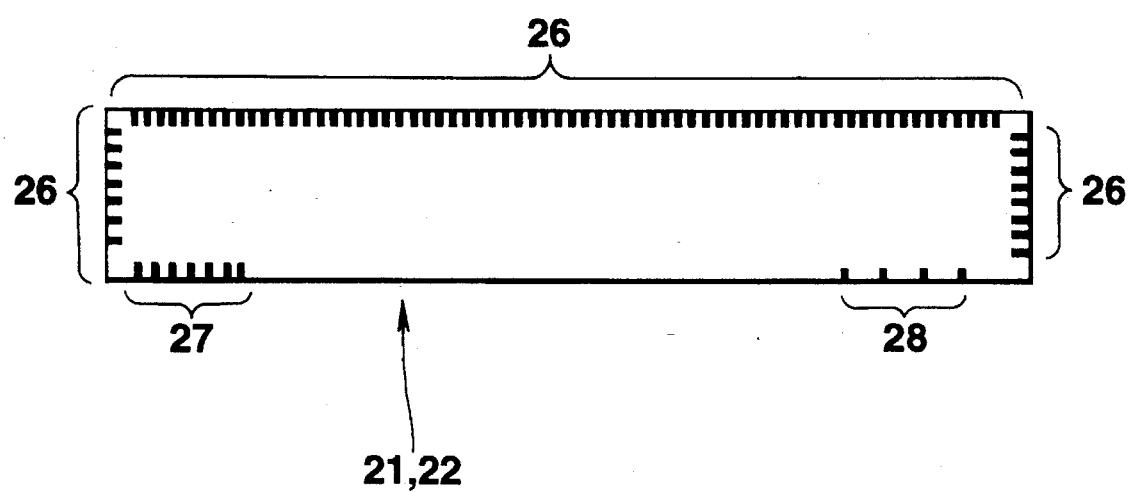
FIG. 7 is a bottom view on an enlarged scale of an IC chip having a first modified arrangement of electrodes.
Figure 8:
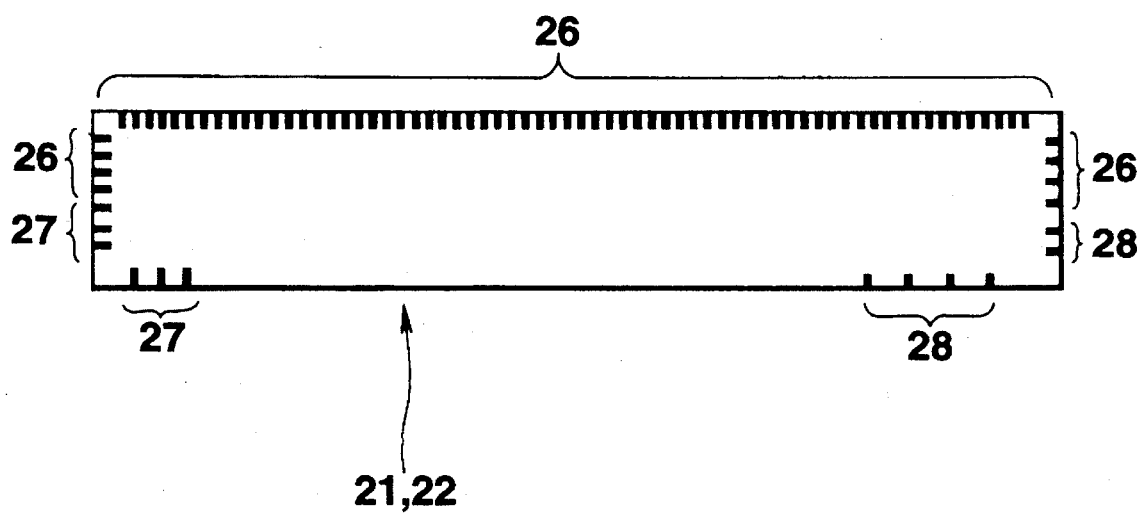
FIG. 8 is a bottom view on an enlarged scale of an IC chip having a second modified arrangement of electrodes.
Figure 9:
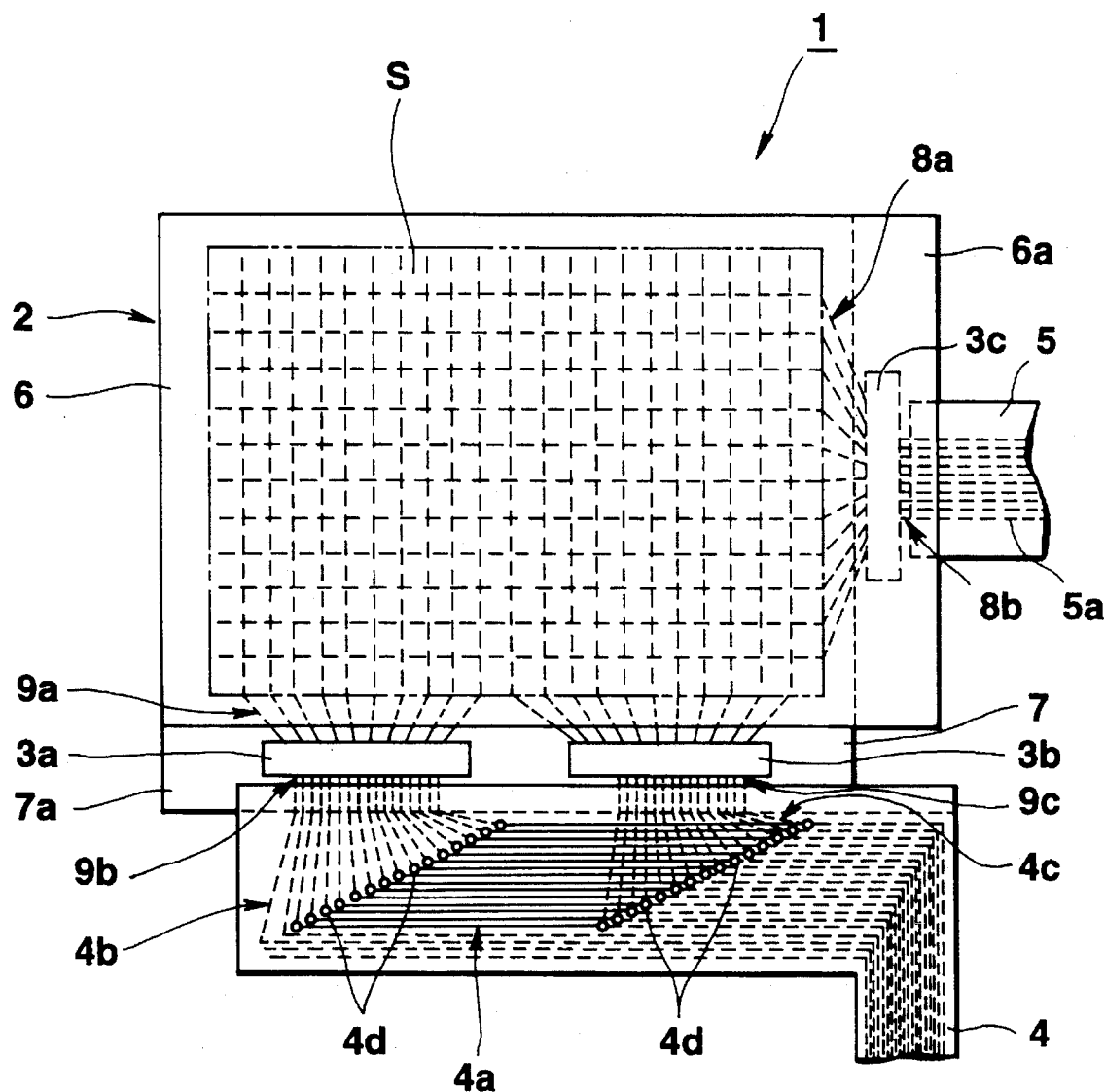
FIG. 9 is a plan view of a conventional arrangement of bonding an IC chip to an LCD device.

FIGS. 7 and 8 show modified forms to the electrode arrangement of the IC chips 21 and 22. In the electrode arrangement of FIG. 7, arrays of output electrodes 26 are arranged along and in contact with one longer side and the opposite shorter sides of the IC chip 21 (22). On the other hand, respective arrays of common input electrodes 27 and the non-common input electrodes 28 are arranged along and in contact with the other longer side of the IC chip 21 (22) near the opposite ends (or shorter sides) of the IC chip 21 (22). In the electrode arrangement of FIG. 8, arrays of output electrodes 26 are arranged and in contact with one longer side and the opposite shorter sides of the IC chip 21 (22), and arrays of common input electrodes 27 are arranged and in contact with the other longer side and one shorter side of the IC chip 21 (22), and arrays of non-common input electrodes 28 are arranged along and in contact with the other shorter side and the other longer side of the IC chip 21 (22). In the electrode arrangements of FIGS. 7 and 8, the output electrode arrays 26, the common input electrode arrays 27 and the non-common input electrode arrays 28 respectively continuously extend so that any kind of electrode arrays does not interrupt other kind of electrode arrays.

The present invention is not rigidly restricted to the embodiments described above. It is to be understood that a person skilled in the art can easily change and modify the present invention without departing from the scope of the invention defined in the appended claims.

What is claimed is:

1. An arrangement of bonding IC chips to a liquid crystal display (LCD) device, comprising:

an LCD device including a first board-shaped transparent substrate and a second board-shaped transparent substrate opposite to each other, the first transparent substrate having a size larger than the second transparent substrate so that the first transparent substrate includes an extension beyond an edge of the second transparent substrate, a surface of said extension having first output wiring patterns formed thereon, each of the first output wiring patterns including a first output pad, said surface of said extension having first input wiring patterns formed thereon, each of the first input wiring patterns including a first input pad, said surface of said extension having second output wiring patterns, each of the second output wiring patterns including a second output pad, said surface of said extension having second input wiring patterns formed thereon, each of the second input wiring patterns including a second input pad, the first and second input pads being positioned nearer to an edge of said surface of said extension than the first and second output pads, the IC chips being arranged along said surface of said extension, the first and second input wiring patterns extending along the direction of the arrangement of the IC chips and being electrically connected to the first and second input pads;

a first IC chip of the IC chips which includes output electrodes adjacent to and electrically connected to the first output pads and includes input electrodes adjacent to and electrically connected to the first input pads;

a second IC chip of the IC chips which includes output electrodes adjacent to and electrically connected to the second output pads and includes input electrodes adjacent to and electrically connected to the second input pads;

means for bonding the first output pads to the output electrodes of said first IC chip;

means for bonding the first input pads to the input electrodes of said first IC chip;

means for bonding the second output pads to the output electrodes of said second IC chip;

means for bonding the second input pads to the input electrodes of said second IC chip; and wherein at least one of said first and second IC chips includes a pair of input electrodes connected to each other in the at least one IC chip and the input pads corresponding to the at least one IC chip comprise pads adjacent to and electrically connected to the pair of input electrodes of the at least one IC chip.

2. The arrangement as recited in claim 1, wherein said first and second IC chips have the form of a bare IC chip.

3. The arrangement as recited in claim 1, wherein said bonding means comprise an anisotropic electrically-conductive adhesive.

4. The arrangement as recited in claim 1, wherein the electrodes of said first and second IC chips have bumps and said bonding means comprise an anisotropic electrically-conductive adhesive for bonding the bumps to the pads.

5. The arrangement as recited in claim 1, wherein each of the first and second input wiring patterns and the first and second output wiring patterns has an end positioned at an edge of the first substrate, said ends being joined to a board-shaped connector a single side surface of which includes electrically-conductive patterns.

6. The arrangement as recited in claim 1, wherein the first and second input wiring patterns are connected to only a pad adjacent to and electrically connected to one input electrode of the pair of the input electrodes.

7. The arrangement as recited in claim 1, wherein said first substrate includes a second extension extending beyond an edge of the second substrate and adjoining said first-mentioned extension.

8. The arrangement as recited in claim 7, wherein a surface of said second extension in the same plane as said surface of said first-mentioned extension has third output wiring patterns formed thereon and including third output pads, and said surface of said second extension has third input wiring patterns formed thereon and including third input pads.

9. The arrangement as recited in claim 8, wherein said surface of said second extension has a third IC chip mounted thereon, the third IC chip having electrodes bonded to the third output pads and the third input pads.

10. The arrangement as recited in claim 9, wherein the first and second input wiring patterns and the first and second output wiring patterns have one end positioned at an edge of the first substrate, said one end being joined to a board-shaped connector a single side surface of which includes electrically-conductive patterns.

11. An arrangement of bonding IC chips to a liquid crystal display (LCD) device, comprising:

an LCD device including a first board-shaped transparent substrate and a second board-shaped transparent substrate opposite to each other, the first transparent substrate having a size larger than the second transparent substrate so that the first transparent substrate includes an extension beyond an edge of the second transparent substrate, a surface of said extension having first output wiring patterns formed thereon, each of the first output wiring patterns including a first output pad, said surface of said extension having first input wiring patterns formed thereon, each of the first input wiring patterns including a first input pad, said surface of said extension having second output wiring patterns, each of the second output wiring patterns including a second output pad, said surface of said extension having second input wiring patterns formed thereon, each of the second input wiring patterns including a second input pad, the first and second input pads being positioned nearer to an edge of said surface of said extension than the first and second output pads, the IC chips being arranged along said surface of said extension, the first and second input wiring patterns extending along the direction of the arrangement of the IC chips and being electrically connected to the first and second input pads;

a first IC chip of the IC chips which includes output electrodes adjacent to and electrically connected to the first output pads and includes input electrodes adjacent to and electrically connected to the first input pads;

a second IC chip of the IC chips which includes output electrodes adjacent to and electrically connected to the second output pads and includes input electrodes adjacent to and electrically connected to the second input pads;

means for bonding the first output pads to the output electrodes of said first IC chip;

means for bonding the first input pads to the input electrodes of said first IC chip;

means for bonding the second output pads to the output electrodes of said second IC chip;

means for bonding the second input pads to the input electrodes of said second IC chip; and wherein said first and second IC chips each include a pair of input electrodes connected to each other in the IC chips and the input pads adjacent to and electrically connected to the IC chips comprise input pads adjacent to and electrically connected to the pairs of input electrodes.

12. The arrangement as recited in claim 11, wherein each of the first and second input wiring patterns is connected to only an input pad of the input pads adjacent to and electrically connected to an input electrode of the pair of input electrodes of each of the IC chips which is nearer to the other IC chip.

13. An arrangement of bonding IC chips to a liquid crystal display (LCD) device, comprising:

a substrate including a first output wiring pattern and a second output wiring pattern, said substrate including a first input wiring pattern and a second input wiring pattern, the first output wiring pattern including a first output pad, the second output wiring pattern including a second output pad, the first input wiring pattern including a first input pad, the second input wiring pattern including a second input pad, a first IC chip of the IC chips which has a first output electrode adjacent to and electrically connected to the first output pad, said first IC chip having a first input electrode adjacent to and electrically connected to the first input pad, said first IC chip having a third input electrode to connected to the first input electrode;

a second IC chip of the IC chips which has a second output electrode adjacent to and electrically connected to the second output pad, said second IC chip having a second input electrode adjacent to and electrically connected to the second input pad, said second IC chip having a fourth input electrode connected to the second input electrode;

means for bonding the first output pad to the first output electrode of said first IC chip;

means for bonding the first input pad to one of the first and third input electrodes of said first IC chip;

means for bonding the second output pad to the second output electrode of said first IC chip; and means for bonding the second input pad to one of the second and fourth input electrodes of said first IC chip.

14. The arrangement as recited in claim 13, wherein the first input pad on said substrate is positioned nearer to said second IC chip than the second input pad; and the second input pad on said substrate is positioned nearer to said first IC chip than the first input pad.

15. A structure of a display device, comprising:

a display device including a transparent substrate and display elements, the substrate having a display region and a non-display region, and the display elements being mounted on the display region of the substrate;

a first integrated circuit including an output electrode and at least one set of input electrodes, the first integrated circuit having a left side edge and a right side edge and said one set of the input electrodes being formed in the vicinity of the right side edge;

a second integrated circuit including an output electrode and at least one set of input electrodes, the second integrated circuit having a left side edge and a right side edge and said one set of the input electrodes being formed in the vicinity of the left side edge, the first and second integrated circuits being arranged side by side on the non-display region of the substrate facing the right side edge of the first integrated circuit to the left side edge of the second integrated circuit;

a plurality of output pads formed on the substrate, each being electrically connected to the one of the output electrodes of the first and second integrated circuits;

a plurality of output wiring patterns formed on the substrate, each electrically connecting one of the output pads to one of the display elements;

a first set of input pads formed on the substrate and electrically connected to one set of the input electrodes of the first integrated circuit;

a second set of input pads formed on the substrate and electrically connected to one set of the input electrodes of the second integrated circuit; and an input wiring pattern formed on the substrate and having a common portion and an interconnecting portion, the interconnecting portion electrically connecting the first set of the input pads to the second set of input pads, respectively, the common portion having a junction connected to the interconnecting portion and a terminal to be connected outside the device.

16. The device recited in claim 15, wherein:

the first and second integrated circuits have the form of a bare integrated circuit chip;

the output electrodes of the first and second integrated circuits are bonded to output pads; and the sets of the input electrodes of the first and second integrated circuits are bonded to the first and second sets of the input pads, respectively.

17. The device as recited in claim 16, wherein:

the output electrodes of the first and second integrated circuits are bonded to said output pads by an anisotropic electrically conductive adhesive; and the sets of the input electrodes of the first and second integrated circuits are bonded to the first and second sets of the input pads, respectively by an anisotropic electrically conductive adhesive.

18. The device as recited in claim 17, wherein:

the output electrodes and the sets of input electrodes have the form of bumps.

19. The device as recited in claim 16, wherein:

the output electrodes and the sets of input electrodes have the form of bumps.

20. The device as recited in claim 15, wherein at least one of the first and second integrated circuits includes a pair of input electrodes connected to each other in the integrated circuit thereof.

* * * * *